United States Patent
Schiro et al.

(10) Patent No.: US 9,315,694 B2
(45) Date of Patent: Apr. 19, 2016

(54) VINYL ACETATE/VINYL 3,5,5-TRIMETHYLHEXANOATE COPOLYMER BINDER RESINS

(75) Inventors: Antonietta Schiro, Milan (IT); Tito Zanetta, Milan (IT); Christoph Balzarek, Krefeld (DE); Olivier Borgmeier, Neuss (DE); Guido Frey, Riedstadt (DE); Leif Johnen, Voerde (DE); Donald Raff, Waynesville, NC (US); Heinz Strutz, Moers (DE)

(73) Assignee: OXEA GMBH, Oberhausen (DE)

( * ) Notice: Subject to any disclaimer, the term of this patent is extended or adjusted under 35 U.S.C. 154(b) by 217 days.

(21) Appl. No.: 14/342,655

(22) PCT Filed: Sep. 12, 2011

(86) PCT No.: PCT/EP2011/004578
§ 371 (c)(1),
(2), (4) Date: Mar. 4, 2014

(87) PCT Pub. No.: WO2013/037382
PCT Pub. Date: Mar. 21, 2013

(65) Prior Publication Data
US 2014/0220342 A1 Aug. 7, 2014

(51) Int. Cl.
| | |
|---|---|
| *C08K 5/00* | (2006.01) |
| *D02G 3/00* | (2006.01) |
| *C09J 11/06* | (2006.01) |
| *C08F 218/08* | (2006.01) |
| *C09D 7/12* | (2006.01) |
| *C08F 218/10* | (2006.01) |
| *C08F 220/18* | (2006.01) |

(52) U.S. Cl.
CPC .............. *C09J 11/06* (2013.01); *C08F 218/08* (2013.01); *C09D 7/1233* (2013.01); *C08F 218/10* (2013.01); *C08F 220/18* (2013.01); *Y10T 428/2933* (2015.01)

(58) Field of Classification Search
CPC ................................ C09J 11/06; C09D 7/1233
USPC ....................................................... 524/284
See application file for complete search history.

(56) References Cited

U.S. PATENT DOCUMENTS

| | | |
|---|---|---|
| 2,600,450 A | 6/1952 | Home et al. |
| 5,354,803 A | 10/1994 | Dragner et al. |
| 5,434,216 A | 7/1995 | Mudge et al. |
| 5,576,384 A | 11/1996 | Nölken et al. |
| 2002/0065361 A1 | 5/2002 | Tanimoto et al. |
| 2002/0069965 A1 | 6/2002 | Koehler et al. |
| 2007/0112117 A1 | 5/2007 | Weitzel |
| 2010/0167609 A1 | 7/2010 | McLennan et al. |
| 2010/0167610 A1* | 7/2010 | McLennan ............ C08F 218/08 442/1 |

FOREIGN PATENT DOCUMENTS

| | | |
|---|---|---|
| EP | 0851015 A1 | 7/1998 |
| EP | 1580244 A2 | 9/2005 |
| EP | 2202253 A2 | 6/2010 |
| FR | 1525842 A | 5/1968 |
| JP | 2004217724 A | 8/2004 |

OTHER PUBLICATIONS

Smith et al. New Vinyl Ester Monomers for Emulsion Polymer, Progress in Organic Coatings, vol. 22, p. 19-25, Elsevier (1993).
Hydrocarbon Processing. "Convert butenes to high octane oligomers", G. Scharfe, 52 (1973), No. 4, pp. 171-173.
Weissermel et al. Industrielle Organische Chemie, 3rd. Edition, 1988, pp. 248-250, VCH Verlagsgesellschaft GmbH.
Bassett. Hydrophobic Coatings from Emulsion Polymers, Journal of Coating Technology, vol. 73, No. 912, pp. 43-55 (2001).
Ullmann's Encyclopedia of Industrial Chemistry, 5th Edition, vol. A5, 1986, p. 244-245, Wiley.
Ullmann's Encyclopedia of Industrial Chemistry, 6th Edition, vol. 6, 2003, p. 3, Wiley.
Kirk-Othmer Encyclopedia of Chemical Technology, 3rd. Ed., vol. 23, 1983, pp. 831-845, Wiley.
International Search Report dated May 22, 2012.

* cited by examiner

*Primary Examiner* — Hui Chin
(74) *Attorney, Agent, or Firm* — Michael W. Ferrell

(57) ABSTRACT

The present invention relates to a copolymer composition comprising 5-95 pphwm of vinyl acetate and 95-5 pphwm of vinyl 3,5,5-trimethylhexanoate, wherein the corresponding 3,5,5-trimethylhexanoic acid has a content of the 3,5,5-trimethylhexanoic acid isomer of at least 88% by weight.
Said copolymer is composed and synthesized so as to be useful in the formulation of binders for fibrous substrates such as woven or nonwoven products, paints, adhesives for porous or non-porous substrates, construction cementitious compositions, redispersible powders.

20 Claims, No Drawings

VINYL ACETATE/VINYL 3,5,5-TRIMETHYLHEXANOATE COPOLYMER BINDER RESINS

TECHNICAL FIELD

This application is a national phase application based on International Application No. PCT/EP2011/004578, filed Sep. 12, 2011. The priority of PCT/EP2011/004578 is hereby claimed and the disclosure incorporated herein by reference.

This invention relates to the preparation of novel polymers comprising vinyl acetate and vinyl 3,5,5-trimethylhexanoate. The polymers are typically emulsions polymers and may optionally contain one or more additional comonomers selected from, for example, ethylene, alkyl(meth)acrylate and/or functional monomers including self-crosslinking monomers such as N-methylol(meth)acrylamide. Such polymers have utility in a variety of applications, including for example adhesives and binders for coatings and fibrous substrates.

BACKGROUND

The use of vinyl acetate containing aqueous copolymers as binders for bonding and coating different substrates is known. A wide range of comonomers such as for example ethylene or vinyl esters of α-substituted fatty acids are often used to improve hydrophobicity and hydrolytic stability of the vinyl acetate copolymers.

JP 2004-217724 discloses an aqueous emulsion which has good water resistance, polymerisation stability and storage stability and a process to prepare the emulsion polymer. The vinyl ester monomer that can be used is vinyl acetate with the addition of ethylene. The emulsion can be used as an adhesive for paper coatings, general woodwork, and as a binder for nonwoven products.

US 2002/0065361 discloses a polyvinyl ester resin emulsion having a high viscosity and good water resistance. The emulsion is produced in a method of polymerizing a vinyl ester monomer in the presence of polyvinyl alcohol serving as protective colloid and in the presence of a water-insoluble, hydroxyl-group containing compound, and can be used as an adhesive that can be readily formed into transparent films. Vinyl esters that can be used include vinyl formate, vinyl acetate, vinyl propionate and vinyl pivalate. Ethylene can be added to the emulsion in the range of 3-35% by weight to improve the water resistance and heat resistance.

US 2002/069965 discloses a process for preparing adhesives wherein the adhesive has improved adhesion. The adhesive is made by polymerizing a comonomer mixture comprising the following of: a) one or more monomers from the group consisting of the vinyl esters of unbranched and branched carboxylic acids of 1 to 10 carbon atoms, the esters of acrylic acid and methacrylic acid with branched and unbranched alcohols of 1 to 12 carbon atoms, vinyl aromatic compounds, vinyl halides and α-olefins, and b) from 0.01 to 50% by weight, based on the overall weight of the comonomers, of a vinyl ester of α-branched tertiary monocarboxylic acids of 11 carbon atoms, in the presence of c) from 0.1 to 15% by weight, based on the overall weight of the comonomers, of polyvinyl alcohol. Some of the preferred vinyl esters can be vinyl acetate, VeoVa 9/10 and vinyl 2-ethylhexanoate.

EP 0851015 discloses an adhesive having low VOC that is based on a polyvinyl alcohol stabilized vinyl ester ethylene copolymer dispersion comprising of 100 parts by weight polyvinyl ester portion, 10 to 100 parts by weight vinyl ester ethylene copolymer, and 1 to 10 parts by weight part or full-soaped polyvinyl alcohol with a viscosity from 40 to 120 mPas and a degree of hydrolysis from 85 to 100 mol %. The polyvinyl ester portion contains 80-100% by weight of several vinyl esters of branched or unbranched alkyl carboxylic acids with 1-18 carbon atoms and 0-20% by weight other or multiple ethylenic unsaturated monomer units.

EP 1580244 discloses a water-based bicomponent wood adhesive having improved heat resistance and extended pot life. The adhesive is comprised of vinyl acetate and N-methylolacrylamide as a crosslinking-agent and also including an aromatic and/or cyclo aliphatic monomer, such as 2-phenoxy ethyl acrylate and/or isobornyl methacrylate, and methyl methacrylate. Additional vinyl esters that can be used are vinyl formate, vinyl isobutyrate, vinyl pivalate, vinyl 2-ethylhexanoate, vinyl esters of saturated, branched monocarboxylic acids having 9 to 10 carbon atoms in the acid radical, such as VeoVa9 or VeoVa10, vinyl esters of relatively long-chain, saturated or unsaturated fatty acids, such as, for example, vinyl laurate, vinyl stearate and vinyl esters of benzoic acid and substituted derivatives of benzoic acid, such as vinyl p-tertbutylbenzoate.

U.S. Pat. No. 5,434,216 discloses a latex adhesive used for woodworking having improved water, heat and creep resistance. The composition of the adhesive is based on vinyl acetate/N-methylolacrylamide polymer emulsions which are stabilized with 1.5 to 2.5% by weight of 88% hydrolyzed polyvinyl alcohol and 1 to 4% by weight of 95-99.5% hydrolyzed polyvinyl alcohol, the two alcohols comprising at least 3% by weight of the emulsion solids. The N-methylolacrylamide and vinyl acetate copolymers can also be used in combination with: (1) other vinylesters including vinyl formate, vinyl propionate, vinyl butyrate, vinyl isobutyrate, vinyl valerate, vinyl 2-ethyl hexanoate, vinyl isooctanoate, vinyl nonanoate, vinyl decanoate, vinyl pivalate or vinyl versatate; (2) ethylene; (3) alkyl esters of acrylic and methacrylic acid such as methyl acrylate, methyl methacrylate, ethyl acrylate or ethyl methacrylate; (4) substituted or unsubstituted mono and dialkylesters of α,β-unsaturated dicarboxylic acids such as the substituted and unsubstituted mono and dibutyl, mono and diethyl maleate esters as well as the corresponding fumarates, itaconates and citronates; (5) α,β-unsaturated carboxylic acids such as crotonic, acrylic, methacrylic, fumaric, maleic, itaconic and citraconic acids.

US 2010/0167610 discloses a polymer composition suitable as a binder resin for fibrous substrates such as woven or nonwoven products including textiles, apparel in general, papers, scrim, engineered fabrics, glass or other mineral fibers, roofing or flooring materials. The binder resin comprises a copolymer obtained by reacting (i) vinyl acetate, (ii) at least one vinyl ester of α-monosubstituted fatty acids; and (iii) at least one functional monomer, such as self-crosslinking monomer, and optionally other comonomers. In particular vinyl 2-ethylhexanoate is used as α-monosubstituted fatty acid.

US 2010/0167609 discloses a polymer composition comprising a copolymer obtained by reacting vinyl acetate; at least one vinyl ester of neoalkanoic acids and at least one additional component selected from the group consisting: (i) at least one α-olefin; (ii) at least one functional monomer; (iii) at least one ester of ethylenically unsaturated carboxylic acids. The compositions are especially useful in or as binders for fibrous substrates, such as woven or nonwoven products including textiles, apparel in general, papers, scrim, engineering fabrics, glass or mineral fibers, roofing or flooring material.

FR 1 525 842 A discloses a copolymer composition comprising a vinyl ester with a linear alkyl chain, such as vinyl acetate, a vinyl ester of a tertiary alkanoic acid and an ester of methacrylic acid. The copolymer composition is used in paints.

Copolymers of vinyl acetate and vinyl esters of neoalkanoic acid have been discussed in the literature for use in paints. New Vinyl Ester Monomers for Emulsion Polymers, Progress in Organic Coating, Vol. 22, pp. 19-25, Elsevier (1993) discusses water resistance and coating performance and Hydrophobic Coatings from Emulsion Polymers, Journal of Coating Technology, Vol. 73, No. 912, pp. 43-55 (2001) discusses pigmented paints.

U.S. Pat. No. 5,576,384 discloses low-emission dispersion paints with a copolymer composition comprising monomer units derived from unsaturated hydrolysable organic silicon compounds and which are based on vinyl esters, such as vinyl acetate and vinyl versatate.

U.S. Pat. No. 2,600,450 A refers to a copolymer composition comprising an ester of acrylic acid and a vinyl ester, such as vinyl 2-ethylhexanoate or vinyl 3,5,5-trimethylhexanoate. The copolymers are used as pour point depressants for wax-containing hydrocarbon liquids.

Thus, the art refers to the use of vinyl versatate as a comonomer in such copolymers. Versatic acids, in particular $C_9$-$C_{11}$ acids, are prepared by reacting of olefinically compounds with carbon monoxide and then with water to produce highly branched acids containing a neo structure on the α-carbon atom adjacent to the carboxyl group. Said neoalkanoic acids are commercially available under the tradename Versatics, VeoVa 9 or VeoVa 10, from Shell. The preparation process is conducted in a technical manner in the presence of Lewis acids, such as boron trifluoride, as disclosed in Weissermel, Arpe, Industrielle Organische Chemie, $3^{rd}$ Edition, 1988, pg. 150-152. Due to the neighboring group steric effect, esters based on versatic acids exhibit a high heat resistance and high hydrolytic stability towards water and vinyl esters of $C_9$-$C_{11}$ versatic acids (VeoVa10) are used in the manufacture of copolymers for binders in resins. An example of such copolymer comprises 30% VeoVa10 and 70% vinyl acetate, as disclosed in New Vinyl Ester Monomers for Emulsion Polymer, Progress in Organic Coatings, Vol. 22, pg. 19-25, Elsevier (1993).

The manufacturing process of versatic acids requires the addition of carbon monoxide to the oligomeric olefin under pressure in the presence of a Lewis acid and then in a second step, the addition of water to recover the desired acid. Due to the complex manufacturing process versatic acids are quite costly and available to a limited amount.

SUMMARY OF INVENTION

It is therefore an object of the present invention to provide a copolymer composition having similar properties as copolymer compositions based on vinyl versatates, but using vinyl esters which are cost attractive and which are readily available. The present invention solves this object by providing copolymers comprising vinyl acetate and vinyl 3,5,5-trimethylhexanoate and optionally with additional monomer units and/or crosslinking functionalities, as well as binders based on such copolymers, to improve properties, such as, for example, hydrolytic stability, solvent and water resistance, adhesion to low-energy surfaces, as well as offer high dry strength, wet strength, mechanical strength and the like in articles comprising such copolymers.

In one aspect, the present invention is directed to a copolymer composition comprising:
a) 5-95 pphwm, preferably 10-90 pphwm of vinyl acetate; and
b) 95-5 pphwm, preferably 90-10 pphwm of vinyl 3,5,5-trimethylhexanoate, wherein the corresponding 3,5,5-trimethylhexanoic acid has a content of the 3,5,5-trimethylhexanoic acid isomer of at least 88% by weight.

The copolymers of the present invention comprise vinyl acetate (VA) and vinyl 3,5,5-trimethylhexanoate, wherein the corresponding 3,5,5-trimethylhexanoic acid has a content of the 3,5,5-trimethylhexanoic acid isomer at least 88% by weight, preferably at least 97% by weight.

The various features and advantages of the invention will be apparent from the discussion which follows.

DETAILED DESCRIPTION

The invention is described in detail below with reference to various examples which are for purposes of illustration, only. Terminology as used herein has its ordinary meaning, unless a more specific meaning is apparent from the following description.

3,5,5-trimethylhexanoic acid is manufactured by hydroformylation, or also called oxo-reaction, of di-isobutylene with a mixture of carbon monoxide and hydrogen in the presence of a transition metal catalyst, such as a cobalt or rhodium catalyst. Di-isobutylene is commercially available from the work-up of the $C_4$-stream from steam cracking and comprises mainly 2,4,4-trimethylpentene-1 and 2,4,4-trimethyl-pentene-2 (Hydrocarbon Process. 52 (1973), No. 4, pages 171-173; Ullmann's Encyclopedia of Industrial Chemistry, 6th Edition, Vol. 6, page 3).

The resulting aldehyde mixture from the hydroformylation reaction of di-isobutylene comprises 3,5,5-trimethylhexanal as main constituent together with small amounts of 3,4,4- and 3,4,5-trimethylhexanal. In addition, very small amounts of further aldehydes, such as 2,5,5-trimethylhexanal, 4,5,5-trimethylhexanal and 6,6-dimethylheptanal are present. The aldehyde mixture is then oxidized with oxygen or an oxygen containing gas to provide 3,5,5-trimethylhexanoic acid as an isomeric acid mixture, which is further purified. The manufacture of 3,5,5-trimethylhexanoic acid starting from the hydroformylation of di-isobutylene and followed by the oxidation of 3,5,5-trimethylhexanal is well known in the art, Ullmann's Encyclopedia of Industrial Chemistry, $5^{th}$. Edition, Vol. A5, 1986, p. 244, Wiley and commercially available 3,5,5-trimethylhexanoic acid exhibits a content of the 3,5,5-trimethylhexanoic acid isomer of at least 88% by weight. 3,5,5-trimethylhexanoic acid is then further processed into vinyl 3,5,5-trimethylhexanoate by processes known in the art, such as disclosed in Weissermel, Arpe, Industrielle Organische Chemie, $3^{rd}$. Edition, 1988, pp. 248-250, VCH Verlagsgesellschaft mbH.

The inclusion of vinyl 3,5,5-trimethylhexanoate in polymer systems allows to achieve good performances in term of hydrophobicity, adhesion to low-energy surfaces and hydrolytic stability. The unique and defined structure of the 3,5,5-trimethylhexanoic moiety having the neo-structure at the end of the hydrocarbon chain and having no alkyl substituents at the α-carbon atom adjacent to the carboxylic moiety is important in order to ensure constant performances at the highest level. Further, 3,5,5-trimethylhexanoic acid is readily available on an economical attractive cost basis compared to the branched neoalkanoic acids with the neo-structure at the α-carbon atom adjacent to the carboxylic acid moiety. Vinyl 3,5,5-trimethylhexanoate present in the copolymer composition of the present invention derives from 3,5,5-trimethylhexanoic acid having a content of the 3,5,5-trimethylhexanoic acid isomer at least 88% by weight, preferable at least 97% by weight.

The copolymer composition according to the present invention may optionally contain one or more additional comonomers and/or functional monomers selected from the group comprising:
(i) 40-1 pphwm, preferably 35-5 pphwm, more preferably 25-10 pphwm of at least one α-olefin,
(ii) 10-0.1 pphwm, preferably 8-0.5 pphwm, more preferably 8-2 pphwm of at least one functional monomer,
(iii) 40-1 pphwm, preferably 30-5 pphwm, more preferably 20-5 pphwm of at least one ester of ethylenically unsaturated carboxylic acids.

Said copolymer is composed and synthesized so as to be useful in connection with emulsion in general: for example as binders for fibrous substrates such as woven or nonwoven products, paints, adhesives for porous or non-porous substrates, construction cementitious compositions, redispersible powders.

Moreover, the copolymer of the invention may also be used, in form of redispersible powder obtained by drying a dispersion, in tile adhesive compositions or in form of solution, as primers for building substrates The term "functional monomer" includes self crosslinking monomers as well as monomer units with functional moieties, including stabilizing moieties such as ionic groups or hydroxyl groups capable of reacting with a crosslinking material and so forth.

The abbreviation "pphwm" refers to parts per hundred weight monomer based on monomer supplied to the reaction medium unless otherwise indicated.

The terminology "alkyl(meth)acrylate" refers to alkyl acrylates and alkyl methylacrylates, typically $C_1$-$C_{12}$ alkyl such as butyl acrylate or 2-ethylhexyl acrylate and so forth.

Additional monomers such as α-olefin monomers are also provided. Examples of suitable α-olefin monomer include ethylene, propylene, α-butylene, α-pentylene, α-hexylene or α-octylene.

Preferred polymers include emulsion interpolymers as descripted herein, however the optional inclusion of other comonomers is contemplated. Other potentially useful comonomers are 1-heptene, butadiene, hexadiene, isoprene, styrene, methyl styrene or divinyl benzene. Representative of still other ethylenically unsaturated monomers include halogenated monomers such as vinyl chloride, vinylidene chloride, chloroprene or chlorostyrene. The inventive copolymers may be made by a variety of techniques by which vinyl acetate polymers are made including by bulk, solution, suspension and emulsion processes described in Kirk-Othmer Encyclopedia of Chemical Technology, $3^{th}$. Ed., Vol. 23, pp. 831-845 (Wiley 1983). The preparation of the inventive compositions can be carried out using continuous or discontinuous processes of free-radical emulsion polymerization. The polymerization may be conducted with the assistance of customary reaction vessels such as loop or stirred reactors. Preference is given to using discontinuous processes.

In these processes, water-soluble and/or oil-soluble initiator systems such as peroxodisulfates, azo compounds, hydrogen peroxide, organic hydroperoxides or dibenzoyl peroxide are employed. These may be used either by themselves or in combination with reducing compounds such as Fe(II) salts, sodium pyrosulfite, sodium hydrogen sulfite, sodium sulfite, sodium dithionite, sodium formaldehyde-sulfoxylate, ascorbic acid, as redox catalyst system. The emulsifiers, and/or where appropriate, protective colloids, additives and/or auxiliaries may be added before, during or after the polymerization. Examples of emulsifiers include alkyl aryl polyglycol ethers and alkyl polyglycol ethers each preferably having from 8 to 50 mol of ethylene oxide units per molecule, block copolymers of ethylene oxide with propylene oxide, alkylsulfonates or alkylarylsulfonates, alkyl sulfates, alkyl and aryl ether sulfates and phosphates each having preferably from 8 to 18 carbon atoms in the lipophilic part and up to 50 ethylene oxide or propylene oxide units in the hydrophilic part, and also monoesters or diesters of sulfosuccinic acid or alkylphenols each having preferably from 8 to 18 carbon atoms in the alkyl radical. A preferred type of emulsifier does not contain linear alkyl phenol units in the lipophilic part.

Optionally, the polymeric compositions of the invention are grafted onto a polyhydroxy polymer, such as polyvinyl alcohol, as disclosed in U.S. Pat. No. 5,354,803. Any suitable technique for grafting the composition with a suitable polymer may be used. Other suitable polyhydroxy compounds for grafting may include sugars, etherified cellulose derivatives and starch.

Representatives of esters of ethylenically unsaturated carboxylic acids which may also be used include alkyl acrylates and methacrylates wherein the alkyl group contains 1-12 or 1-10 carbon atoms and esters of such acids as butenoic, maleic, fumaric or itoconic. Representatives other esters which have an ethylenic unsaturation and are preferred include vinyl formate, vinyl propionate or butyrate. The polymer backbone in the acrylic ester latexes can be either hydrophilic or hydrophobic and it can comprise polymerized soft monomers and/or hard monomers. The soft and hard monomers are monomers which, when polymerized, produce soft or hard polymers, or polymers in-between. Preferred soft acrylic monomers are selected from alkyl acrylates containing 2 to 8 carbon atoms in the alkyl group and include ethyl acrylate, propyl acrylate, n-butyl acrylate and 2-ethylhexyl acrylate. The hard acrylic ester monomers are selected from alkyl methacrylates containing up to 3 carbon atoms in the alkyl group and from non-acrylic monomers such as styrene and substituted styrenes, acrylonitrile, vinylchloride, and generally any compatible monomer the homopolymer of which has a Tg above 50° C. Preferred acrylic ester monomers are selected from alkyl methacrylates containing 1 to 12 carbon atoms in the alkyl group, especially methyl methacrylate.

Further monomers copolymerizable with vinyl esters are ethylenically unsaturated, ionic monomers, for example compounds which bear at least one carboxylic acid, sulfonic acid, phosphoric acid or phosphonic acid group directly adjacent to the double bond unit, or else are bonded thereto via spacer. Examples include α,β-unsaturated $C_3$-$C_8$-monocarboxylic acids, α,β-unsaturated $C_5$-$C_8$-dicarboxylic acids and anhydrides thereof, and monoesters of α,β-unsaturated $C_4$-$C_8$-monocarboxylic acids.

Preference is given to unsaturated monocarboxylic acids, for example acrylic acid, methacrylic acid, and crotonic acid and the anhydrides thereof; unsaturated dicarboxylic acids, for example maleic acid, fumaric acid, itaconic acid and citraconic acid and the monoesters thereof with $C_1$-$C_{12}$-alkanols such as monomethyl maleate and mono n-butyl maleate. Further preferred ethylenically unsaturated ionic monomers are ethylenically unsaturated sulfonic acids, for example vinylsulfonic acid, 2-acrylamido-2-methylpropanesulfonic acid, 2-acryloyloxy- and 2-methacryloyloxyethanesulfonic acid, 3-acryloyloxy- and 3-methacryloyloxypropanesulfonic acid and vinylbenzenesulfonic acid, and ethylenically unsaturated phosphonic acids, for example vinylphosphonic acid.

In addition, as well as the acids mentioned, it is also possible to use the salts thereof, preferably the alkali metal salts thereof or the ammonium salts thereof and especially the sodium salts thereof, for example the sodium salts of vinylsulfonic acid and 2-acrylamidopropanesulfonic acid.

The ethylenically unsaturated free acids mentioned are present in aqueous solution at pH 11 predominantly in the form of their conjugate bases in anionic form and can, like the salts mentioned, be referred to as anionic monomers.

Functional monomers include post crosslinking comonomers, occasionally referred in the art as self-crosslinking monomers. These monomers include for example acrylamidoglycolic acid, methyl methacrylamidoglycolate, N-methylolacrylamide, N-isobutoxymethylacrylamide, N-methylolmethacrylamide, allyl-N-methylolcarbamate, alkyl ethers such as isobutoxy ethers or esters of N-methylolarylamide, of N-methylolmethacrylamide and of allyl-N-methylolcarbamate.

Also suitable as functional monomers are cross-linking epoxide-functional comonomers such as glycidyl methacrylate and glycidyl acrylate. Further examples are silicon-functional comonomers such as acryloxypropyltri(alkoxy)silanes and methacryloxypropyltri(alkoxy)silanes, vinyltrialkyloxysilanes and vinylmethyldialkoxysilanes, with alkoxy groups which can be present being, for example methoxy, ethoxy and ethoxypropylene glycol ether radicals. Mention may also be made of useful monomers having hydroxy or carbonyl groups, for example, hydroxyalkyl methacrylates and acrylates such as hydroxyethyl, hydroxypropyl or hydroxybutyl acrylate or methacrylate and also compounds such as diacetoneacrylamide and acetylacetoxyethyl acrylate or methacrylate, as disclosed in US 2007/0112117.

Crosslinkers that can be used as functional monomers in conjunction with the present invention are also pre crosslinking comonomers such as multiply ethylenically unsaturated comonomers, for example divinyl adipate, divinyl benzene, hexanediol diacrylate, diallyl maleate, allyl methacrylate or triallyl cyanurate.

In a preferred embodiment the copolymer composition comprising:
a) 5-89 pphwm, preferably 20-85 pphwm of vinyl acetate; and
b) 40-10 pphwm of vinyl 3,5,5-trimethylhexanoate,
c) 40-1 pphwm, preferably 20-5 pphwm, of alkyl(meth)acrylate monomer units,
wherein the corresponding 3,5,5-trimethylhexanoic acid has a content of the 3,5,5-trimethylhexanoic acid isomer of at least 88% by weight, preferably at least 97% by weight,
is prepared via emulsion polymerization in presence of 0.5-15 pphwm, preferably 4-10 pphwm of polyvinylalcohol as a protective colloid. The resulting latex can be converted in redispersible powder via spray drying process and finally used in the formulation of a tile adhesive.

The alkyl(meth)acrylate monomer units are generally selected from $C_1$-$C_{12}$ alkyl(meth)acrylate units, and may be for example, butyl acrylate units. In another embodiment of the invention, there is provided a copolymer composition comprising:
a) 5-89.9 pphwm, preferably 50-89.7 pphwm of vinyl acetate; and
b) 40-10 pphwm of vinyl 3,5,5-trimethylhexanoate and
c) 10-0.1 pphwm, preferably 5-0.3 pphwm, of functional monomer units,
wherein the corresponding 3,5,5-trimethylhexanoic acid has a content of the 3,5,5-trimethylhexanoic acid isomer of at least 88% by weight, preferably at least 97% by weight.

The functional monomer units are preferably crosslinking monomer units and still more preferably selfcrosslinking monomer units. In preferred embodiments, the copolymer composition includes from 0.3 to 5 pphwm of selfcrosslinking monomer units such as vinyltrialkyloxysilanes. The copolymer can be made via emulsion polymerization and the final latex can be used as a binder for paints.

In an additional embodiment of the invention, there is provided a copolymer composition comprising:
a) 10-90 pphwm, preferably 60-90 pphwm of vinyl acetate; and
b) 40-10 pphwm of vinyl 3,5,5-trimethylhexanoate, wherein the corresponding 3,5,5-trimethylhexanoic acid has a content of the 3,5,5-trimethylhexanoic acid isomer of at least 88% by weight, preferably at least 97% by weight.

The copolymer is made via solution polymerization using methyl acetate as solvent and the resulting solution can be used as a solvent primer for building substrates like plaster or cement.

As mentioned the copolymer compositions of the present invention may be used as a binder in paint formulations, in general of from 5 to 35 parts by weight of copolymer composition per 50 to 70 parts by weight of filler and pigments.

Preferred fillers used are, for example, calcium carbonate, magnesite, dolomite, kaolin, mica, talc, silica, calcium sulphate, feldspat, barium sulphate and plastic beads. The fillers may be used as individual components. Mixtures of fillers such as, for example, calcium carbonate/kaolin and calcium carbonate/kaolin/talc have been found to be particularly useful in practice. To increase the hiding power and to save on titanium dioxide, finely divided fillers such as, for example, finely divided calcium carbonate and mixtures of various calcium carbonates with different particle size distribution are frequently used.

Examples of white pigments used are zinc oxide, zinc sulphide, basic lead carbonate, antimony trioxide, lithopone (zinc sulphide+barium sulphate) and preferably, titanium dioxide. Examples of inorganic colored pigments which may preferably be used are iron oxides, carbon black, graphite, luminescent pigments, zinc yellow, zinc green, ultramarine and manganese black. Suitable organic colored pigments preferably are, for example indigo, azo dyes, anthraquinone and indigi dyes and metal complex pigments of the azomethine series.

In addition to the fillers and pigments, the paint formulation comprises water and auxiliaries such as dispersants, thickeners, antifoams and preservatives, as known in the art.

EXAMPLES

The following examples are presented to further illustrate the present invention and should not be taken as limiting the invention. Vinyl 3,5,5-trimethylhexanoate was used based on commercially available 3,5,5-trimethylhexanoic acid having a content of the 3,5,5-trimethylhexanoic acid isomer of at least 88% by weight.

Example 1

120 g of water, 733 g of a solution of Mowiol 1388 (12% w/w in water), 0.6 g of 1% aqueous solution of ferrous sulphate and 31 g of a 5% aqueous solution of sodium formaldehyde-sulfoxylate are loaded into a 3-litre reactor equipped with anchor or gate stirrer, condenser, thermocouple and outer jacket connected to a thermostatic bath. After flushing nitrogen, a mixture of monomers containing 58 g of vinyl acetate, 12 g of butyl acrylate and 8 g of vinyl 3,5,5-trimethylhexanoate is charged to the reactor.

The reactor charge is heated to 50° C.; then 40.5 g of a 5% aqueous solution of hydrogen peroxide, 36 g of a 5% aqueous solution of sodium formaldehyde-sulfoxylate and 67.5 g of a 5% aqueous solution of sodium bicarbonate are fed to the reactor for 4 hours and 30 minutes: after the start of polymerization (increase of temperature ΔT=3° C.) a mixture of 767 g of vinyl acetate, 98 g of butyl acrylate and 157 g of vinyl 3,5,5-trimethylhexanoate is fed into the reactor over 4 hours. When feedings are completed, additional amounts of initiators are added to decrease the level of residual monomers, maintaining the product at maximum temperature for 30 minutes. Once at the end polymerization resulted in a dispersion having a solid content of 50%, Brookfield RVT viscosity <300 mPa*s (23° C., 20 rpm, spindle 1), sieve residue at 75 microns <0.03%, pH=4.5-5.5.

The latex is then converted in redispersible powder via spray drying process and finally used in the formulation of a tile adhesive. The technical characteristics are comparable to those obtained with the reference, that is a latex made with the same recipe in which vinyl 3,5,5-trimethylhexanoate is substituted with Veova® 10 in the same quantity (w/w).

Example 2

267 g of methyl acetate, 181 g of vinyl acetate, 46 g of vinyl 3,5,5-trimethylhexanoate, 0.05 g of citric acid and 0.290 g of di-(4-tert-butylcyclohexyl)peroxydicarbonate) are loaded into a 3-litre reactor equipped with anchor or gate stirrer, condenser, thermocouple and outer jacket connected to a thermostatic bath. Dissolve 1 g of di-(4-tert-butylcyclohexyl) peroxydicarbonate) in 78 g of methyl acetate (S1).

The reactor charge is heated to 65° C. for the thermal ignition of the polymerization; after the start of reaction 47 g of S1 and a mixture of 672 g of vinyl acetate and 167 g of vinyl 3,5,5-trimethylhexanoate are fed to the reactor for 4 hours. During the feedings (start at time=0) proceed with the following addition: t=30 min add 88 g of methyl acetate; t=1 hour add 10.6 g of S1 and set the temperature of the thermostatic bath at 75° C.; t=2 hour add 10.6 g of S1; t=3 hour add 10.6 g of S1 and 590 g of methyl acetate. When feedings are completed keep the product at maximum temperature for 1 hour. Once at the end polymerization resulted in a solution having a solid content of 51% and a Brookfield RVT viscosity of 8000 mPa*s (23° C., 20 rpm, spindle 5).

Example 3

Into a 3-liter reactor equipped with anchor or gate stirrer, condenser, thermocouple and external jacket connected to a thermostatic bath 394 g of water and 1.8 g of sodium acetate are loaded. A mixture of monomers containing 700 g of vinyl acetate, 300 g of vinyl 3,5,5-trimethylhexanoate and 2 g of vinyl triethoxysilane is added to 409 g of water containing 23 g of Cetopal O55, 18 g of Rhodacal Ds4/E25, 11 g of 25% aqueous solution of vinyl sulphonate, 5.6 g of sodium acetate and 0.2 g of defoamer Comiel L808E, under stirring to form a pre-emulsion.

The initial charge in the reactor is heated to 70° C., then 75 g of pre-emulsion is added and the reaction is initiated with 0.4 g of ammonium persulfate dissolved in 10 g of water. The remainder of the pre-emulsion is then fed into the reactor together with a solution of 3.1 g ammonium persulfate in 70 g of water over 4.5 hours. The temperature is maintained at 78-84° C. throughout the reaction. At the end of the feed time the product is maintained at the maximum temperature for 60 minutes and then cooled: at ambient temperature 28 g of butyldiglycol acetate are added to the dispersion.

The dispersion has a solid content of 51.5%, a Brookfield RVT viscosity of 100 mPa*s (20 rpm, spindle 1), sieve residue at 44 microns 0.03%, pH=4.5.

Example 3A

Comparative

A dispersion was prepared using the formulation of Example 3, except that vinyl 3,5,5-trimethylhexanoate was substituted with Veova® 10 (same quantity in weight).

The dispersion has a solid content of 51.3%, a Brookfield RVT viscosity of 50 mPa*s (20 rpm, spindle 1), sieve residue at 44 microns 0.05%, pH=4.6.

Paint Formulation

The dispersions coming from Example 3 and 3A are used as binders in the following interior emulsion paint 75% PVC (Pigment Volume Concentration) formulation:

| Component | % w/w | Function | Suppliers |
| --- | --- | --- | --- |
| Water | 24.20 | | |
| Foamex 1488 | 0.20 | Defoamer | Evonik |
| Natrosol PLUS 331 | 0.50 | Cellulose | Aqualon |
| Caustic Soda (sol. 10%) | 0.10 | pH-regulator | Various |
| Sodium Hexametaphosphate (sol. 10%) | 2.50 | Dispersant | Various |
| Ethylene glycol | 0.50 | Co-solvent | Various |
| Disponil 400 ML | 0.20 | Wetting agent | Cognis |
| Texanol | 0.40 | Coalescent | Eastman |
| Acticide FS(N) | 0.20 | Biocide | Thor |
| Titanium dioxide type RXL | 10.00 | Pigment | Huntsman |
| Clay type Polestar 200 P | 6.00 | Extender | Imerys |
| Calcium carbonate type Omyacarb 5 AV 5 μm | 40.50 | Extender | Omya |
| Dispersion from Example 3 or 3A | 14.00 | Binder | |
| Water | 0.70 | | |
| Total | 100.00 | | |

The paints and the films of the two polymers 3 and 3A were tested according to the following test methods:

Wet Scrub Resistance

The wet scrub resistance is measured in accordance with DIN 53778 to analyze the binding power of the emulsion paints.

A film of paint is applied on the Leneta panel at 120 μm of wet thickness. After 28 days drying in standard condition, 23° C. and 50% Relative Humidity (H.R.), the test is performed using the proper equipment and measuring the number of cycles done from a brush to remove the thickness of paint and discover the support where it is applied. The higher is the no of cycles the higher is the wet scrub resistance of the paint.

Water Absorption

The water absorption is measured in accordance with UNI 9589 that establishes a method to evaluate the behavior of a paint film when it is in water, by measuring its variation in weight. This method is applied at the films of polymer.

The polymer dispersion is applied on a foil of polyethylene of 0.2 mm thickness. For 7 days the film is dried at 23° C. and 50% H.R. The test is run in double after 1 h, 24 h, 3 days and 7 days of immersion in water according to following procedure.

Cut eight specimens with a diameter of 60 mm, remove the specimens of the polymer from the substrate, weigh them on an analytical balance and immerse them in water, two specimens for each time of immersion. Remove the film from the water, dry the excess water and weigh it with an analytical balance. The difference between initial and final weight is the water absorbed (stated as percent of variation of the initial weight).

The test results are compiled in Table 1.

TABLE 1

|  |  | Example | |
| --- | --- | --- | --- |
|  |  | 3 | 3A |
| Wet scrub resistance (DIN 53778) | n° of cycles | 950 | 980 |
| Water Absorption % (UNI 9589) | 1 hour | 11 | 11 |
|  | 24 hours | 50 | 48 |
|  | 3 days | 90 | 92 |
|  | 7 days | 96 | 100 |

The data disclosed in Table 1 indicate, that paints and films based on vinyl 3,5,5-trimethylhexanoate, wherein the corresponding 3,5,5-trimethylhexanoic acid has a content of the 3,5,5-trimethylhexanoic isomer of at least 88% by weight, preferably at least 97% by weight exhibit similar test results compared to paints and films based on Veova®10.

The invention claimed is:

1. A copolymer composition comprising:
   a) 5-95 pphwm of vinyl acetate; and
   b) 95-5 pphwm vinyl 3,5,5-trimethylhexanoate, wherein the corresponding 3,5,5-trimethylhexanoic acid has a content of the 3,5,5-trimethylhexanoic acid isomer of at least 88% by weight.

2. The copolymer composition according to claim 1, wherein in the vinyl 3,5,5-trimethylhexanoate the corresponding 3,5,5-trimethylhexanoic acid has a content of the 3,5,5-trimethylhexanoic acid isomer of at least 97% by weight.

3. A copolymer composition according to claim 1 containing at least:
   one additional comonomer selected from the group comprising:
   (i) 40-1 pphwm of at least one a-olefin,
   (ii) 10-0.1 pphwm of at least one functional monomer,
   (iii) 40-1 pphwm of at least one ester of ethylenically unsaturated carboxylic acids.

4. A paint formulation comprising at least water, fillers, pigments and a copolymer comprising
   a) 5-95 pphwm of vinyl acetate; and
   b) 95-5 pphwm of vinyl 3,5,5-trimethylhexanoate, wherein the corresponding 3,5,5-trimethylhexanoic acid has a content of the 3,5,5-trimethylhexanoic acid isomer of at least 88% by weight.

5. A paint formulation according to claim 4, wherein the copolymer comprises at least:
   one additional comonomer selected from the group comprising:
   (i) 40-1 pphwm of at least one a-olefin,
   (ii) 10-0.1 pphwm of at least one functional monomer,
   (iii) 40-1 pphwm of at least one ester of ethylenically unsaturated carboxylic acids.

6. A fibrous product including a fibrous substrate and applied thereto a copolymer composition comprising:
   a) 5-95 pphwm of vinyl acetate; and
   b) 95-5 pphwm of vinyl 3,5,5-trimethylhexanoate, wherein the corresponding 3,5,5-trimethylhexanoic acid has a content of the 3,5,5-trimethylhexanoic acid isomer of at least 88% by weight.

7. A fibrous product according to claim 6 wherein the copolymer comprises at least:
   one additional comonomer selected from the group comprising:
   (i) 40-1 pphwm of at least one a-olefin,
   (ii) 10-0.1 pphwm of at least one functional monomer,
   (iii) 40-1 pphwm of at least one ester of ethylenically unsaturated carboxylic acids.

8. A redispersible powder obtained by drying a dispersion of the copolymer according to claim 1.

9. A tile adhesive formulation comprising the redispersible powder of claim 8.

10. A primer for building substrates comprising a solution of the copolymer according to claim 1.

11. The copolymer composition according to claim 1, comprising 10-90 pphwm of vinyl acetate.

12. The copolymer composition according to claim 1, comprising 90-10 pphwm of vinyl 3,5,5-trimethylhexanoate.

13. The copolymer composition according to claim 1, comprising 10-90 pphwm of vinyl acetate and 90-10 pphwm of vinyl 3,5,5-trimethylhexanoate.

14. A copolymer composition comprising:
   a) 5-95 pphwm of vinyl acetate; and
   b) 95-5 pphwm of vinyl 3,5,5-trimethylhexanoate, wherein the corresponding 3,5,5-trimethylhexanoic acid has a content of the 3,5,5-trimethylhexanoic acid isomer of at least 97% by weight and containing at least:
   one additional comonomer selected from the group comprising:
   (i) 40-1 pphwm of at least one a-olefin,
   (ii) 10-0.1 pphwm of at least one functional monomer,
   (iii) 40-1 pphwm of at least one ester of ethylenically unsaturated carboxylic acids.

15. A redispersible powder obtained by drying a dispersion of the copolymer according to claim 2.

16. A redispersible powder obtained by drying a dispersion of the copolymer according to claim 14.

17. A tile adhesive formulation comprising the redispersible powder of claim 15.

18. A tile adhesive formulation comprising the redispersible powder of claim 16.

19. A primer for building substrates comprising a solution of the copolymer according to claim 2.

20. A primer for building substrates comprising a solution of the copolymer according to claim 14.

* * * * *